(12) United States Patent
Shim et al.

(10) Patent No.: US 11,740,108 B2
(45) Date of Patent: Aug. 29, 2023

(54) ANTI-POLLUTION OPTICAL ENCODER

(71) Applicant: PixArt Imaging Inc., Hsin-Chu County (TW)

(72) Inventors: Kuan-Choong Shim, Penang (MY); Gim-Eng Chew, Penang (MY); Priscilla Tze-Wei Goh, Penang (MY); Meng-Yee Lim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 293 days.

(21) Appl. No.: 17/104,822

(22) Filed: Nov. 25, 2020

(65) Prior Publication Data
US 2022/0163353 A1    May 26, 2022

(51) Int. Cl.
*G01D 5/34* (2006.01)
*G01D 5/347* (2006.01)

(52) U.S. Cl.
CPC ................. *G01D 5/3473* (2013.01)

(58) Field of Classification Search
CPC .. G01D 5/347; G01D 5/34707; G01D 5/3473; G01D 5/34776
See application file for complete search history.

(56) References Cited

U.S. PATENT DOCUMENTS

| 8,525,102 B2* | 9/2013 | Augustyniak | G01D 5/24409 250/231.13 |
| 2010/0057392 A1* | 3/2010 | York | G01D 5/34 702/94 |

* cited by examiner

*Primary Examiner* — Kevin K Pyo
(74) *Attorney, Agent, or Firm* — Hauptman Ham, LLP (57) ABSTRACT

There is provided an optical encoder including an encoding medium, multiple photodiodes and a signal processing circuit. The encoding medium includes an index track. The index track includes a first index pattern and a second index pattern. The multiple photodiodes include a first index photodiode, a second index photodiode and a reference index photodiode for receiving modulated light from the first index pattern and the second index pattern. When the first index photodiode is aligned with the first index pattern and the second index photodiode is aligned with the second index pattern, the signal processing circuit outputs a triggering signal.

14 Claims, 7 Drawing Sheets

ANTI-POLLUTION OPTICAL ENCODER

BACKGROUND

1. Field of the Disclosure

This disclosure generally relates to an optical encoder and, more particularly, to an optical encoder that has a higher tolerance to the contamination on an encoding medium thereof and a signal processing circuit thereof.

2. Description of the Related Art

The optical encoder generally includes a light source, a code disk and multiple photodiodes. The code disk has slits for modulating emission light of the light source. The photodiodes detect modulated light from the code disk to output detected signals each has a phase shift from another detected signal. The processor calculates a rotation angle of the code disk according to intensity variation of the detected signals.

In the rotary optical encoder, the code disk is further arranged with an index slit for recognizing an absolute position thereof. Meanwhile, the optical encoder further includes an index photodiode to exclusively detect modulated light from the index slit to identify whether the code disk is rotated to a predetermined angle. However, in a high pollution environment that has dust and fragments, when the contamination attaches on the code disk and within a sensing range of the index photodiode, the contamination can reflect or block emission light from the light source to cause the index photodiode to output error signals such that a position misidentification can occur.

Accordingly, the present disclosure further provides an optical encoder and a signal processing circuit thereof that have high noise tolerance to be adapted to the high pollution environment.

SUMMARY

The present disclosure provides an optical encoder and a signal processing circuit thereof in which at least two index patterns are arranged in an index track on an encoding medium of the optical encoder and at least three index photodiodes are included. The signal processing circuit generates a triggering signal according to the AND operation between two comparison signals to indicate a predetermined position or angle of the encoding medium.

The present disclosure provides an optical encoder including an encoding medium and multiple photodiodes. The encoding medium includes an index track that includes a first index pattern and a second index pattern. The multiple photodiodes are configured to detect a relative movement with respect to the encoding medium, and include a first index photodiode, a second index photodiode and a reference index photodiode. When the first index pattern of the index track is aligned with the first index photodiode according to the relative movement, the second index pattern is aligned with the second index photodiode, and the reference index photodiode is between the first index photodiode and the second index photodiode in the index track.

The present disclosure further provides a signal processing circuit of an optical encoder including a trans-impedance amplifier (TIA), a first comparator, a second comparator and an AND gate. The optical encoder includes a first index photodiode, a second index photodiode and a reference photodiode. The TIA is electrically coupled to the first index photodiode, the second index photodiode and the reference index photodiode, and configured to convert a first photocurrent generated by the first index photodiode, a second photocurrent generated by the second index photodiode and a reference photocurrent generated by the reference index photodiode respectively to a first voltage, a second voltage and a reference voltage. The first comparator is configured to compare the first voltage and the reference voltage to output a first comparison voltage. The second comparator is configured to compare the second voltage and the reference voltage to output a second comparison voltage. The AND gate is configured to receive the first comparison voltage and the second comparison voltage to accordingly generate an index output.

The present disclosure further provides an optical encoder including an encoding medium, multiple photodiodes and a signal processing circuit. The encoding medium includes an index track that includes a first index pattern and a second index pattern. The multiple photodiodes are configured to detect a light variation generated by a relative movement with respect to the encoding medium, and includes a first index photodiode, a second index photodiode and a reference index photodiode configured to respectively generate a first photocurrent, a second photocurrent and a reference photocurrent according to the light variation. The signal processing circuit is configured to receive the first photocurrent, the second photocurrent and the reference photocurrent, and generate an index output indicating a predetermined position of the encoding medium when the first index pattern is aligned with the first index photodiode and the second index pattern is aligned with the second index photodiode according to the relative movement.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The optical encoder of the present disclosure confirms whether an encoding medium is moved or rotated to a predetermined position by comparing the photocurrent outputted by two sets of photodiodes so as to eliminate incorrect index output triggered by photocurrent noise caused by the contamination on the encoding medium.

Figure 1:
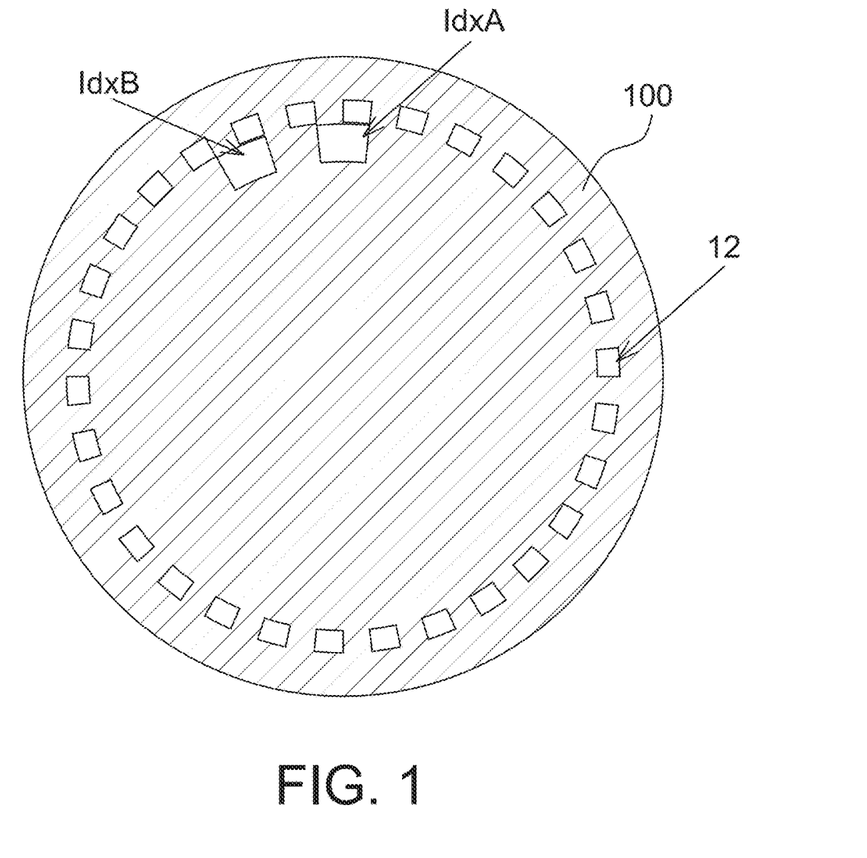
FIG. 1 is a schematic diagram of an encoding medium of an optical encoder according to one embodiment of the present disclosure.

Referring to FIG. 1, it is a schematic diagram of an encoding medium 100 of an optical encoder according to one embodiment of the present disclosure. The encoding medium 100 is a code disk or a code strip according to different applications. The encoding medium 100 is arranged with a plurality of slits or a plurality of reflective stripes as encoding patterns for modulating incident light when the encoding medium 100 is moving or rotating.

The encoding medium 100 includes an index track and a position track 12 arranged at different tracks. The position track 12 is used to indicate a moving distance of the encoding medium 100, e.g., rotation angle herein. The index track is used to indicate a predetermined position of the encoding medium 100, e.g., an original point. Accordingly, when the index pattern of the index track is not detected, the rotation angle is continuously accumulated or counted based on the detection of the position track 12; whereas, when the index pattern of the index track is detected, the accumulated or counted rotation angle is reset to zero, wherein whether the index pattern is detected or not is described using an example hereinafter.

For example, FIG. 1 shows that the encoding medium 100 is a code disk, and thus the index track and the position track 12 are at different radial positions in a radial direction on the encoding medium 100, wherein the radial direction is perpendicular to a moving direction of the encoding medium 100, e.g., a rotation direction herein. In the present disclosure, the index track includes a first index pattern IdxA and a second index pattern IdxB arranged at the same radius. The optical encoder further includes multiple light detecting elements, e.g., photodiodes, arranged corresponding to the index track and the position track 12.

Figure 2:
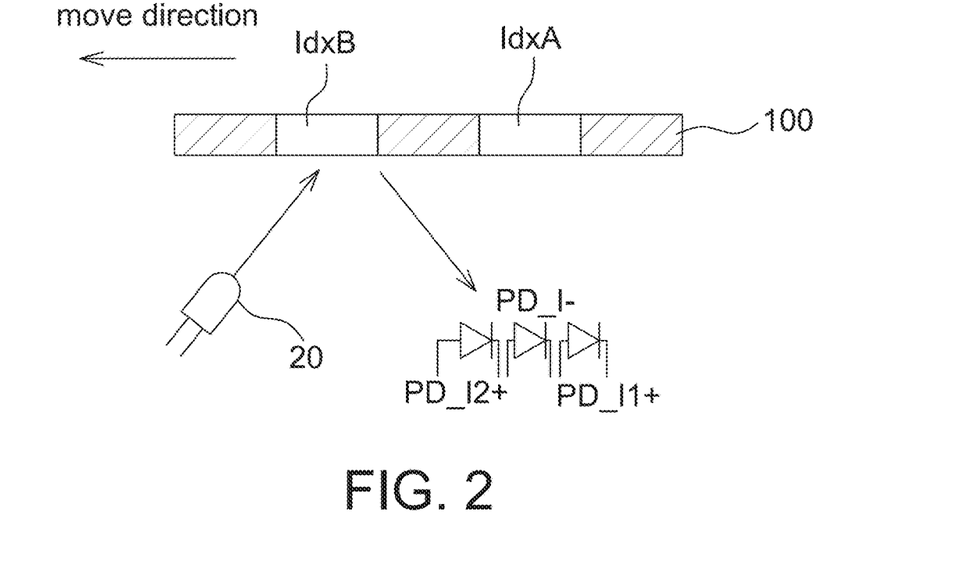
FIG. 2 is a schematic diagram of an optical encoder according to one embodiment of the present disclosure.

Please referring to FIG. 2, it is a schematic diagram of an optical encode according to one embodiment of the present disclosure. The optical encoder includes a light source 200 for illuminating light toward the encoding medium 100 to allow the index track and the position track 12 to modulate emission light from the light source 20. Since one objective of the present disclosure is to improve the noise reduction ability of the index signal, FIG. 2 shows only the first index pattern IdxA and the second index pattern IdxB as well as the index photodiodes PD_I1+, PD_I2+ and PD_I− corresponding to the index track, but omits the position track 12 and corresponding photodiodes thereof.

The position track 12 and the corresponding photodiodes thereof may use conventional configurations without particular limitations; for example, referring to the U.S. patent application Ser. No. 16/878,054, filed on May 19, 2020 and assigned to the same assignee of the present application, and the full disclosure of which is incorporated herein by reference.

That is, the optical encoder of the present disclosure includes multiple photodiodes for detecting the light variation caused by the relative movement with respect to the encoding medium 100, i.e., detecting modulated light. Corresponding to the index track of the encoding medium 100, the optical encoder includes a first index photodiode PD_I1+, a second index photodiode PD_I2+ and a reference index photodiode PD_I− to respectively generate a first photocurrent I1+, a second photocurrent I2+ and a reference photocurrent I− according to the light variation. The index photodiodes and the index patterns are arranged in the way that when the first index pattern IdxA of the index track is aligned with the first index photodiode PD_I1+ according to the relative movement of the encoding medium 100, the second index pattern IdxB is aligned with the second index photodiode PD_I2+. In the index track, the reference index photodiode PD_I− is between the first index photodiode PD_I1+ and the second index photodiode PD_I2+.

Figure 5:
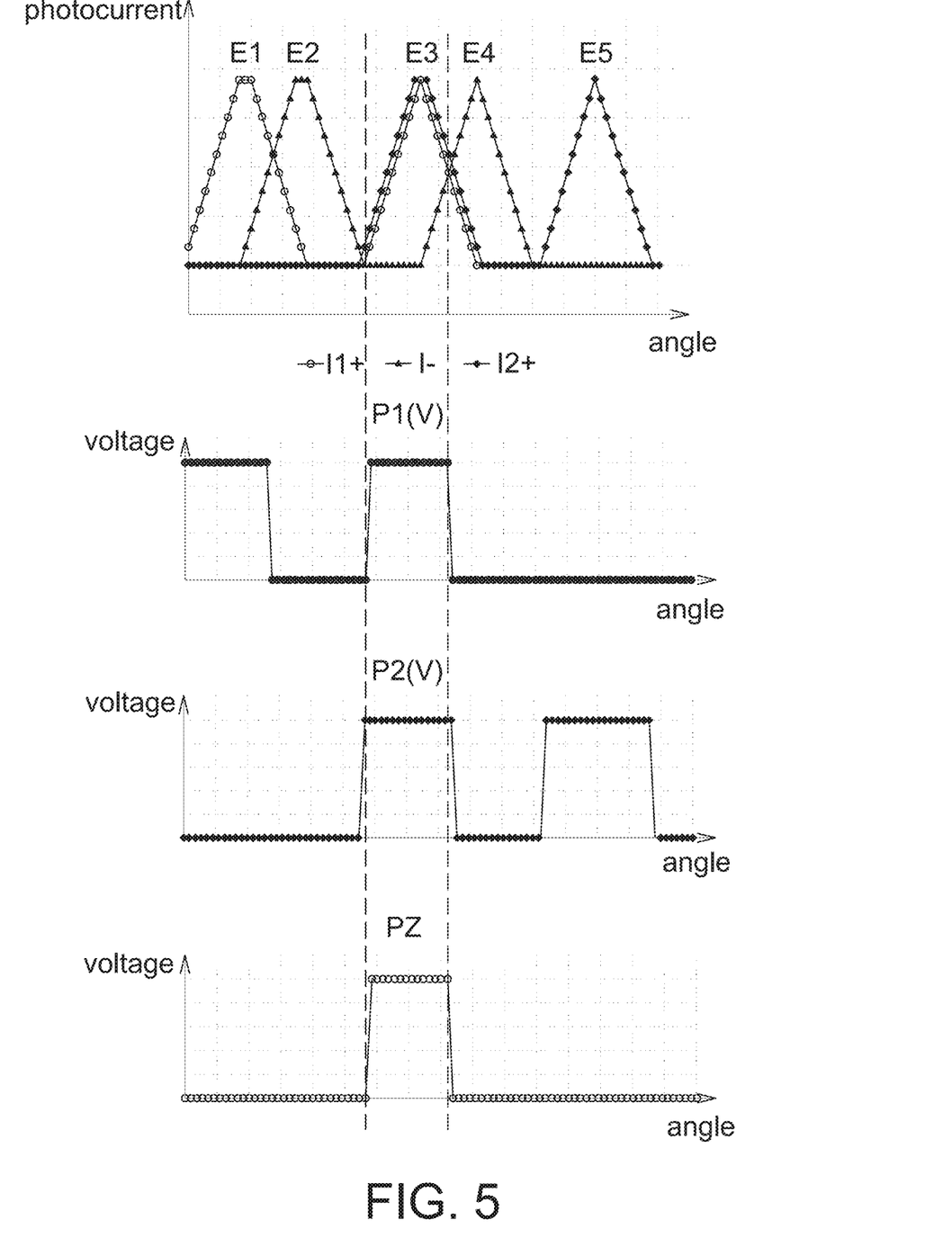
FIG. 5 is a schematic diagram of signals of the signal processing circuit in FIGS. 4A and 4B.

Please referring to FIGS. 3A to 3E, they are operational schematic diagrams when the encoding medium 100 is moving with respect to the index photodiodes, wherein each of FIGS. 3A to 3E shows a different output combination of index photodiodes to indicate one event (e.g., shown as events E1 to E5), and the output photocurrent is shown in FIG. 5. It is seen from FIG. 5 that the photocurrents include not only maximum values and zero values but also include tilted sections, and the tilted sections are formed according to the variation of overlapped area between the index photodiodes and the light pattern of index patterns.

In FIGS. 3A to 3E, the regions shown by IdxA and IdxB respectively indicate reflective light pattern or transmissive light pattern associated with the first index pattern IdxA and the second index pattern IdxB. The index photodiodes PD_I1+, PD_I2+ and PD_I− are shown to have an identical sensing area, but the present disclosure is not limited thereto. FIGS. 3A to 3E show that the photocurrent is outputted when one index photodiode is overlapped with the light pattern of one index pattern. When the index photodiode is aligned with the light pattern of the associated index pattern, the maximum photocurrent is outputted. For simplification purposes, the overlap between the light pattern of one index pattern and one index photodiode is illustrated herein by the overlap between one index pattern and one index photodiode. In the present disclosure, one index pattern being aligned with one index photodiode means a relative position or angle at which the index photodiode receives a maximum light energy of reflected light or transmissive light from the index pattern.

Figure 3A:
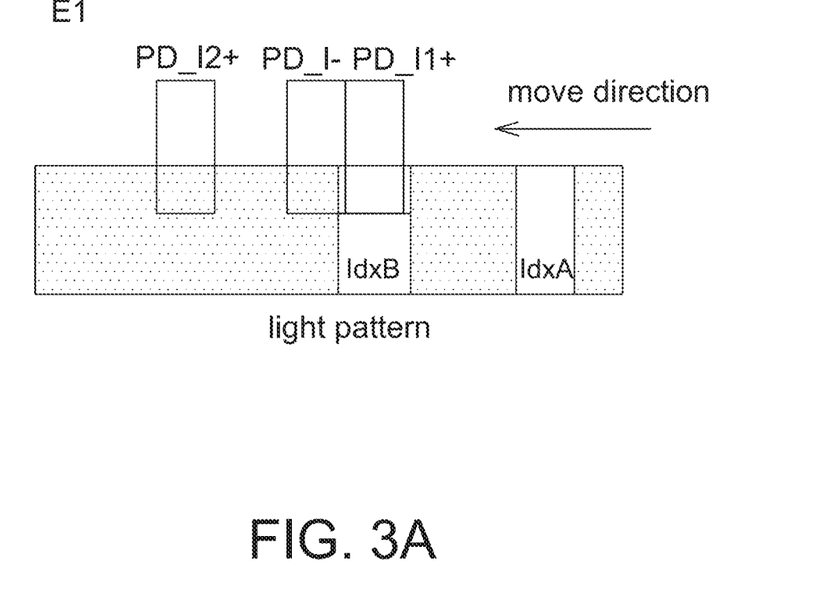
FIGS. 3A to 3E are operational schematic diagrams of an optical encoder according to one embodiment of the present disclosure.

As shown in FIG. 3A, in an event E1, the index pattern starts to have an overlap with the index photodiode. The second index pattern IdxB is aligned with the first index photodiode PD_I1+. Accordingly, at a position corresponding to E1 in FIG. 5, the first photocurrent I1+ has positive values, whereas the second photocurrent I2+ and the reference photocurrent I1 are smaller than the first photocurrent I1+.

Figure 3B:
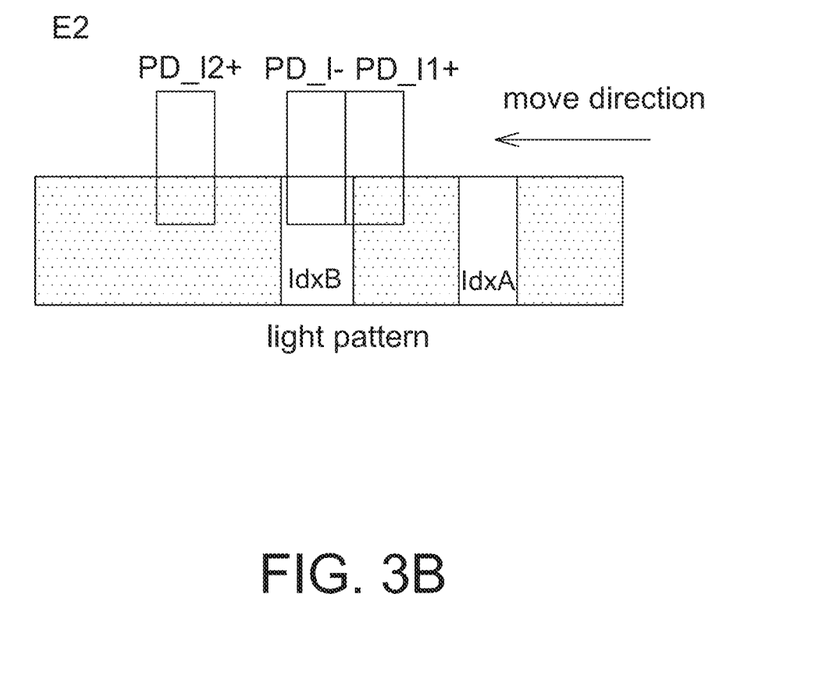

As shown in FIG. 3B, in an event E2, the second index pattern IdxB is aligned with the reference index photodiode PD_I−. Accordingly, at a position corresponding to E2 in FIG. 5, the reference photocurrent I− has positive values, and the first photocurrent I1+ and the second photocurrent I2+ are smaller than the reference photocurrent I−.

Figure 3C:
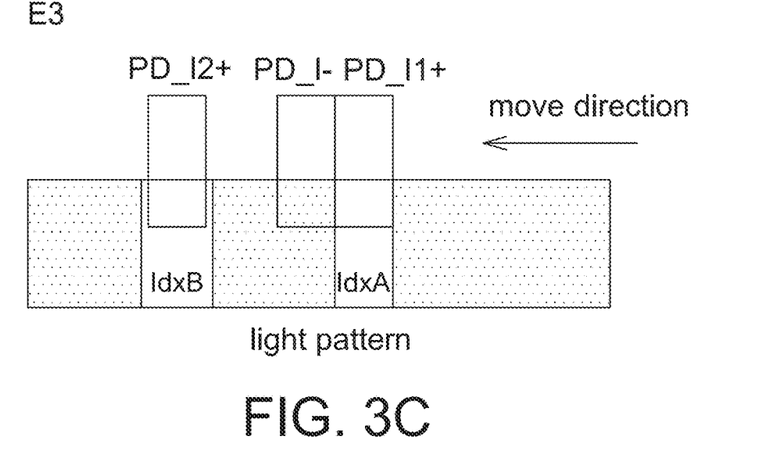

As shown in FIG. 3C, in an event E3, the second index pattern IdxB is aligned with the second index photodiode PD_I2+ and the first index pattern IdxA is aligned with the first index photodiode PD_I1+. Accordingly, at a position corresponding to E3 in FIG. 5, the first photocurrent I1+ and the second photocurrent I2+ have positive values, and the reference photocurrent I− is lower than the first photocurrent I1+ and the second photocurrent I2+.

Figure 3D:
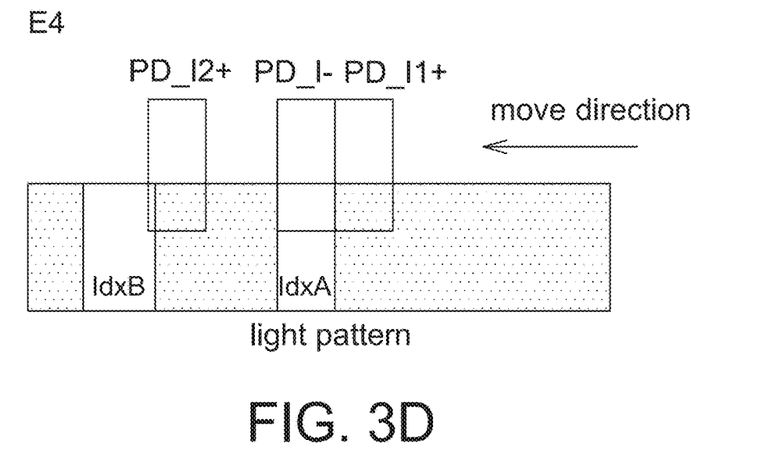

As shown in FIG. 3D, in an event E4, the index pattern starts to leave a region of the index photodiode. The first index pattern IdxA is aligned with the reference index photodiode PD_I−. Accordingly, at a position corresponding to E4 in FIG. 5, the reference photocurrent I− has positive values, and the first photocurrent I1+ and the second photocurrent I2+ gradually decrease to zero.

Figure 3E:
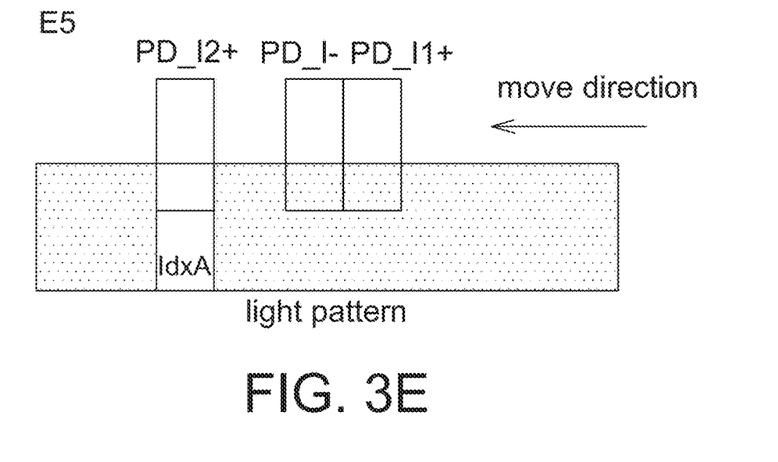

As shown in FIG. 3E, in an event E5, the first index pattern IdxA is aligned with the second index photodiode PD_I2+. Accordingly, at a position corresponding to E5 in FIG. 5, the second photocurrent I2+ has positive values, whereas the first photocurrent I1+ and the reference photocurrent I− are zero.

It should be mentioned that although FIGS. 3A to 3E show that a width of the second index pattern IdxB in a direction of the relative movement is larger than a width of a sensing surface of the index photodiodes and larger than a width of the first index pattern IdxA, the present disclosure is not limited thereto. In other aspects, the first index pattern IdxA and the second index pattern IdxB of the index track have identical widths in the direction of the relative movement.

It is seen from FIG. 3C that when the encoding medium 100 is moved or rotated to a position at which the first index pattern IdxA is aligned with the first index photodiode PD_I1+ and the second index pattern IdxB is aligned with the second index photodiode PD_I2+, the reference index photodiode PD_1− is not aligned with the first index photodiode PD_I1+ or the second index photodiode PD_I2+ such that the first photocurrent I1+ and the second photocurrent I2+ are both larger than the reference photocurrent I− so as to generate an index output PZ by the signal processing circuit, as shown in FIG. 5.

Figure 4A:
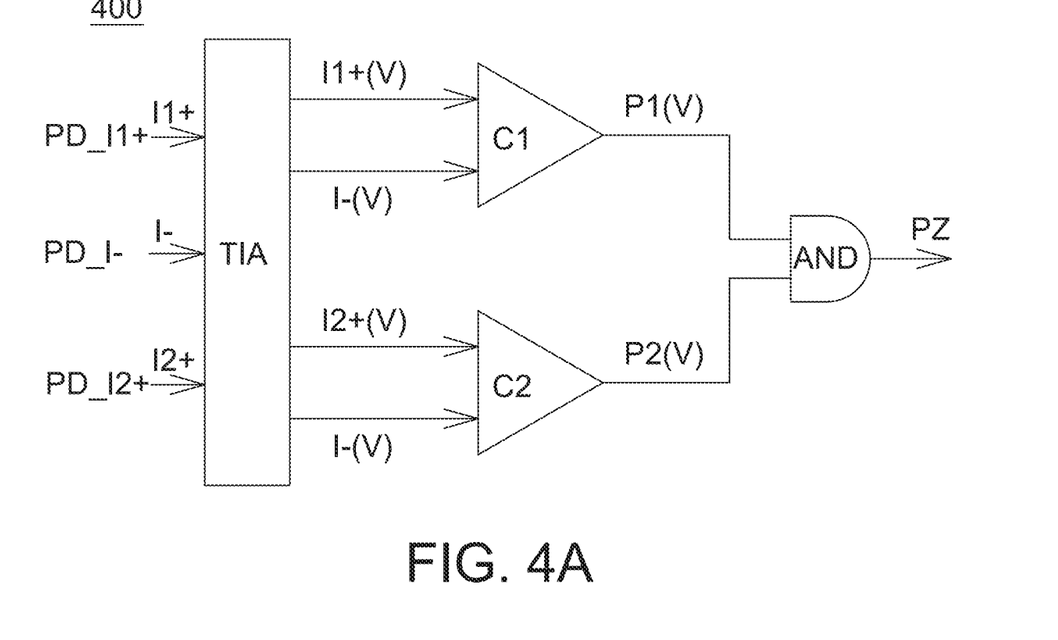
FIGS. 4A and 4B are circuit diagrams of a signal processing circuit of an optical encoder according to some embodiments of the present disclosure.

Please referring to FIG. 4A, it is a circuit diagram of a signal processing circuit 400 of an optical encoder according to one embodiment of the present disclosure. The signal processing circuit 400 includes a trans-impedance amplifier TIA, a first comparator C1, a second comparator C2 and an AND gate. The TIA is electrically coupled to the first index photodiode PD_I1+, the second index photodiode PD_I2+ and the reference index photodiode PD_I− to receive a first photocurrent I1+ generated by the first index photodiode PD_I1, a second photocurrent I2+ generated by the second index photodiode PD_I2+ and a reference photocurrent I− generated by the reference index photodiode PD_I−. The signal processing circuit 400 converts the first photocurrent I1+, the second photocurrent I2+ and the reference photocurrent PD_I− respectively to a first voltage I1+(V), a second voltage I2+(V) and a reference voltage I−(V). The first comparator C1 compares the first voltage I1+(V) with the reference voltage I−(V) to output a first comparison voltage P1(V). The second comparator C2 compares the second voltage I2+(V) with the reference voltage I−(V) to output a second comparison voltage P2(V). The AND gate receives the first comparison voltage P1(V) and the second comparison voltage P2(V) to accordingly generate an index output PZ, as shown in FIG. 5.

Please referring to FIGS. 3A to 3E and FIG. 5 again, when the encoding medium 100 is moved or rotated to the position as shown in FIG. 3C, the first index pattern IdxA is aligned with the first index photodiode PD_I1+ and the second index pattern IdxB is aligned with the second index photodiode PD_I2+ such that the first photocurrent I1+ and the second photocurrent I2+ are both larger than the reference current I1. Accordingly, the first voltage I1+(V) and the second voltage I2+(V) have a potential change such as a positive pulse, but not limited to, as shown corresponding to the event 3 in FIG. 5. After the AND gate, an index output PZ also has a potential change (also show as a positive pulse) to indicate a predetermined position, e.g., the position shown in FIG. 3C, of the encoding medium 100 of the optical encoder.

In the present disclosure, the signal processing circuit 400 is, for example, coupled to a processor (e.g., a digital signal processor or an application specific integrated circuit) or integrated in the processor. As mentioned above, when identifying the potential change of the index output PZ, e.g., as shown in FIG. 5, the processor resets as angle accumulated according to the position track 12 and records that the encoding medium 100 rotates one circle.

Figure 4B:
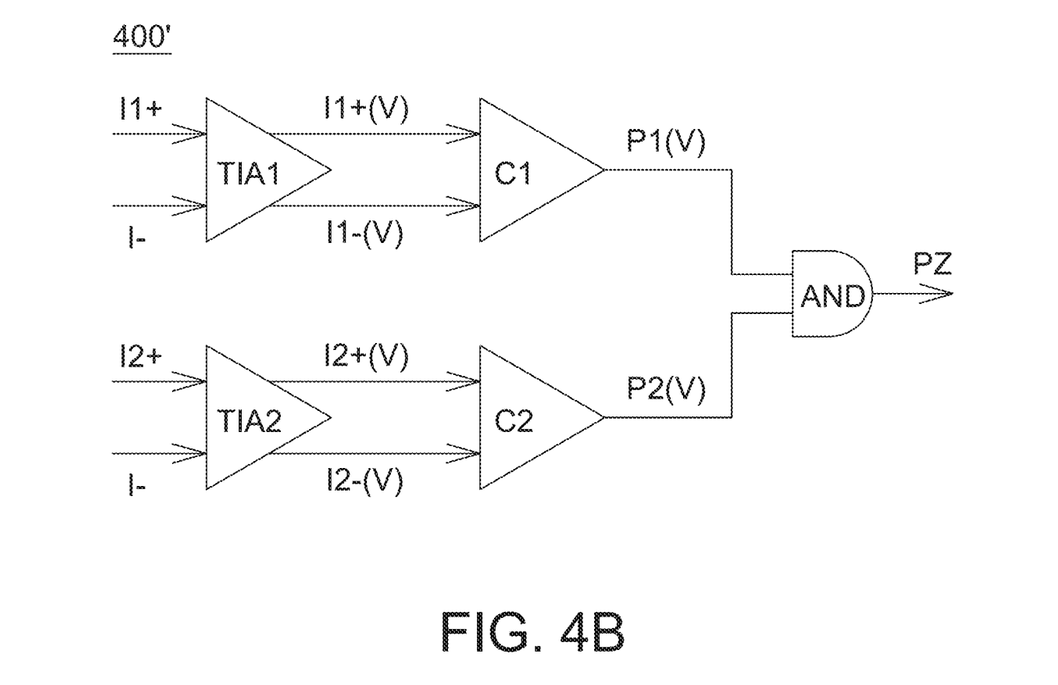

Please referring to FIG. 4B, it is a circuit diagram of a signal processing circuit 400' of an optical encoder according to another embodiment of the present disclosure. The signal processing circuit 400' includes, for example, a first trans-impedance amplifier TIA1 and a second trans-impedance amplifier TIA2. The TIA1 includes a first input end and a second input end, wherein the first input end is used to receive a first photocurrent I1+ to generate a first voltage I1+(V) at a first output end of TIA1, and the second input end is used to receive a reference photocurrent I1− to generate a first reference voltage I1−(V) at a second output end of TIA1. The TIA2 includes a third input end and a fourth input end, wherein the third input end is used to receive a second photocurrent I2+ to generate a second voltage I2+(V) at a third output end of TIA2, and the fourth input end is used to receive the reference photocurrent I1− to generate a second reference voltage I2−(V) at a fourth output end of TIA2. As the second input end of the TIA1 and the fourth input end of the TIA2 receive the same reference current I1−, if the parameter deviation between the TIA1 and TIA2 is ignored, the first reference voltage I1−(V) is substantially identical to the second reference voltage I2−(V).

According to FIG. 5, in the above embodiment, when the first index pattern IdxA is aligned with the first index photodiode PD_I1+ and the second index pattern IdxB is aligned with the second index photodiode PD_I2+, i.e. P1(V) and P2(V) both having a pulse, the index output PZ of the signal processing circuit 400 or 400' generates a pulse. Because the pulse of index output PZ is not generated by any one of P1(V) and P2(V), the noise reduction ability is increased.

The present disclosure may further improve the noise reduction ability by increasing the number of the index photodiodes and the index patterns. Please referring to FIG. 6, it is a schematic diagram of an optical encoder according to another embodiment of the present disclosure. In this embodiment, in addition to the first index photodiode PD_I1+ and the second index photodiode PD_I2+, the optical encoder further includes a third index photodiode PD_I3+. In addition to the first index pattern IdxA and the second index pattern IdxB, the index track further includes a third index pattern IdxC. The index photodiodes and the index patterns are arranged in the way that when the encoding medium 100 is moved or rotated to a position at which the first index pattern IdxA is aligned with the first index photodiode PD_I1+ and the second index pattern IdxB is aligned with the second index photodiode PD_I2+, the third index pattern IdxC is aligned with the third index photodiode PD_I3+, and the reference index photodiode PD_I− is not aligned with the first index pattern IdxA, the second index pattern IdxB or the third index pattern IdxC. A width of a sensing surface of the third index photodiode PD_I3+ is identical to or smaller than a width of the third index pattern IdxC.

Figure 6:
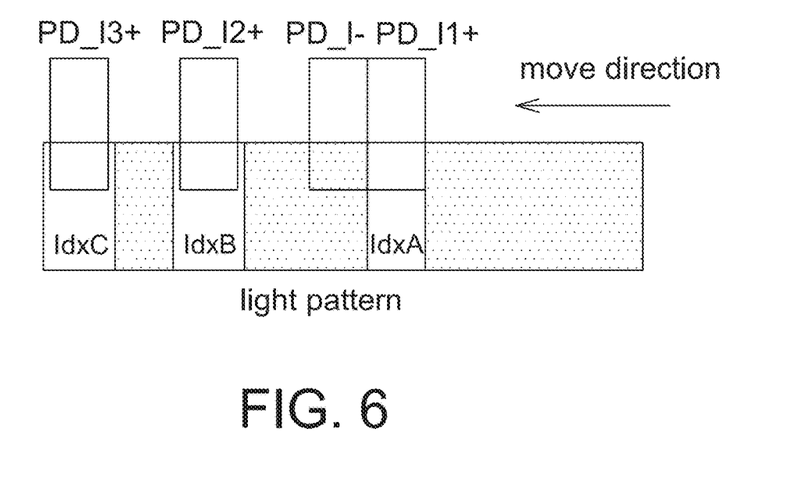
FIG. 6 is a schematic diagram of an optical encoder according to another embodiment of the present disclosure.
Figure 7A:
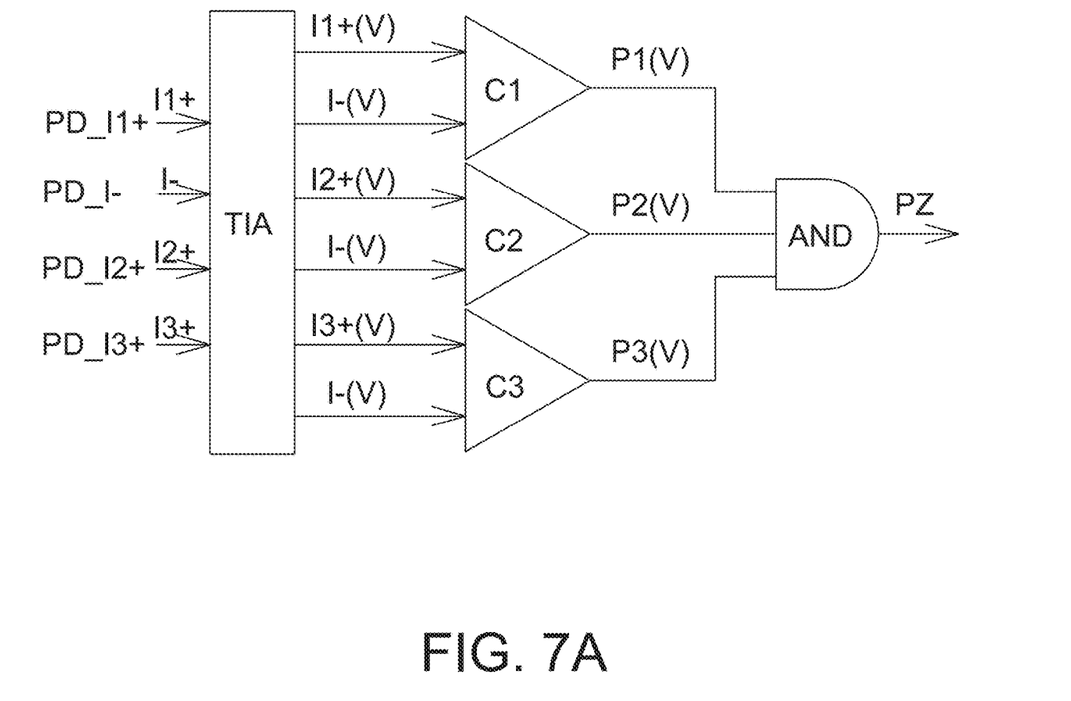
FIGS. 7A and 7B are circuit diagrams of a signal processing circuit of an optical encoder according to other embodiments of the present disclosure.

Corresponding to the arrangement of FIG. 6, the TIA of the signal processing circuit of this embodiment is further electrically coupled to the third index photodiode PD_I3+ and used to convert a third photocurrent I3+ generated by the third index photodiode PD_I3+ to a third voltage I3+(V), as shown in FIG. 7A. The signal processing circuit further includes a third comparator C3 used to compare the third voltage I3+(V) with the reference voltage I−(V) to output a third comparison voltage P3(V). The AND gate receives the first comparison voltage P1(V), the second comparison voltage P2(V) and the third comparison voltage P3(V) to accordingly generate an index output PZ, wherein the method of generating the first comparison voltage P1(V) and the second comparison voltage P2(V) has been illustrated above, and thus details thereof are not repeated herein. Similarly in this embodiment, the index output PZ has a potential change when the first photocurrent I1+, the second photocurrent I2+ and the third photocurrent I3+ are all larger than the reference current I− to indicate a predetermined position, i.e. a position shown in FIG. 6, of the encoding medium 100 of the optical encoder.

Figure 7B:
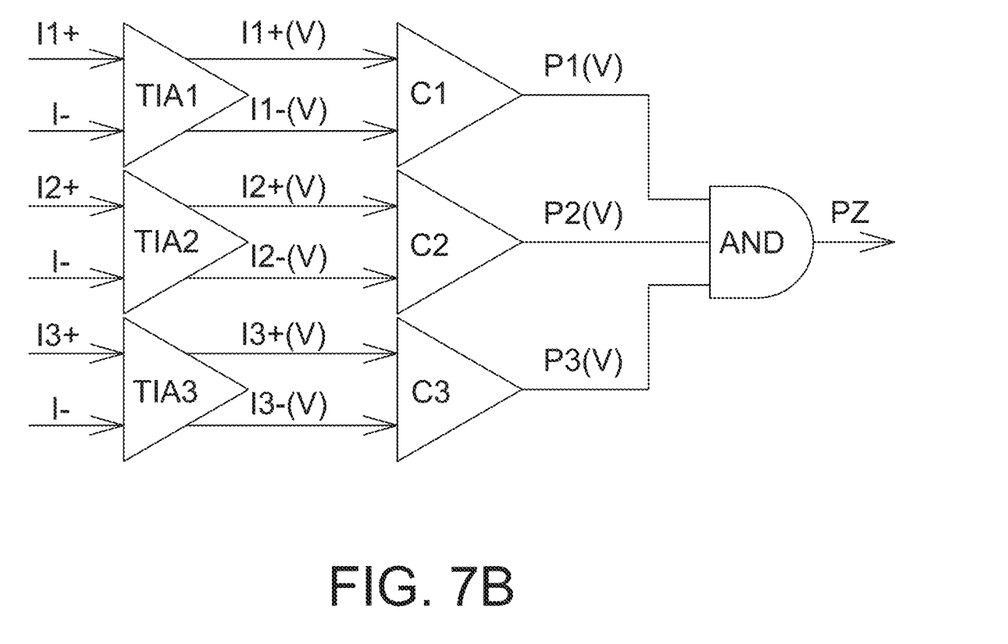

Please referring to FIG. 7B, in another aspect, the signal processing circuit includes a first trans-impedance amplifier TIA1, a second trans-impedance amplifier TIA2 and a third trans-impedance amplifier TIA3. The TIA1 includes a first input end and a second input end, wherein the first input end is used to receive a first photocurrent I1+ to generate a first voltage I1+(V) at a first output end, and the second input end is used to receive a reference photocurrent I1− to generate a first reference voltage I1−(V) at a second output end. The TIA2 includes a third input end and a fourth input end, wherein the third input end is used to receive a second photocurrent I2+ to generate a second voltage I2+(V) at a third output end, and the fourth input end is used to receive the reference photocurrent I1− to generate a second reference voltage I2−(V) at a fourth output end. The TIA3 includes a fifth input end and a sixth input end, wherein the fifth input end is used to receive a third photocurrent I3+ to generate a third voltage I3+(V) at a sixth output end of TIA3, and the sixth input end is used to receive a reference photocurrent I1− to generate a sixth reference voltage I3−(V) at a sixth output end of TIA3. Similarly, as the second input end of the TIA1, the fourth input end of the TIA2 and the sixth input end of the TIA3 receive the same reference current I1−, if the parameter deviation between the TIA1 to TIA3 is ignored, the first reference voltage I1−(V), the second reference voltage I2−(V) and the third reference voltage I3−(V) are substantially identical to each another.

In other aspects, the encoding medium 100 is arranged with more than three index patterns, and the optical encoder includes more than four index photodiodes. When the output photocurrent of the reference index photodiode is smaller than or larger than the photocurrent of all other index photodiodes, the signal processing circuit generates an index output pulse to indicate a predetermined position of the encoding medium 100.

It should be mentioned that although FIG. 2 shows a reflective optical encoder as an example for illustration, the present disclosure is not limited thereto. When the light source 20 and the light detecting elements are arranged at two different sides of the encoding medium 100, a transmissive optical encoder is formed and the index pattern is formed by index slits for light to penetrate therethrough. A person having ordinary skill in the art would understand the configuration of the encoding medium 100 and the signal processing circuit adapted to the transmissive optical encoder after understanding the operation of the reflective optical encoder mentioned above.

It should be mentioned that although the index patterns are illustrated by a shape of rectangle in the above embodiment, the present disclosure is not limited thereto. In other aspects, the index patterns have other shapes, e.g., the trapezoid or triangle, without particular limitations as long as the relative position between the index patterns and the index photodiodes are arranged as shown in FIGS. 3A to 3E or FIG. 6.

It should be mentioned that although the encoding medium 100 is described in the way by moving from right to left as shown in FIGS. 3A to 3E, the present disclosure is not limited thereto. In other aspects, the encoding medium 100 moves from left to right, and the signal processing circuit also generates an index signal pulse at the event shown in FIG. 3C.

As mentioned above, the conventional optical encoder is not able to distinguish noises caused by the contamination on the encoding medium such that incorrect index output can be generated. Accordingly, the present disclosure further provides an encoding medium of an optical encoder (e.g., FIG. 1 and FIG. 6) and a signal processing circuit of an optical encoder (FIGS. 4A-4B and FIGS. 7A-7B) that identify whether the encoding medium is moved or rotated to a predetermined position according to multiple sets of comparison signals so as to increase the noise reduction ability of the optical encoder.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder, comprising:
    an encoding medium, comprising an index track, the index track comprising a first index pattern and a second index pattern; and
    multiple photodiodes, configured to detect a relative movement with respect to the encoding medium, and the multiple photodiodes comprising a first index photodiode, a second index photodiode and a reference index photodiode,
    wherein when the first index pattern of the index track is aligned with the first index photodiode according to the relative movement, the second index pattern is aligned with the second index photodiode, and the reference index photodiode is between the first index photodiode and the second index photodiode in the index track.

2. The optical encoder as claimed in claim 1, wherein the first index pattern and the second index pattern of the index track have a same width in a direction of the relative movement.

3. The optical encoder as claimed in claim 1, wherein the first index pattern and the second index pattern of the index track have different widths in a direction of the relative movement.

4. The optical encoder as claimed in claim 1, wherein
    the encoding medium further comprises a position track,
    the index track and the position track are at different radial positions in a radial direction of the encoding medium, and
    the radial direction is perpendicular to a direction of the relative movement.

5. The optical encoder as claimed in claim 1, wherein when the first index pattern is aligned with the first index photodiode and the second index pattern is aligned with the second index photodiode according to the relative movement, the reference index photodiode is not aligned with the first index pattern or the second index pattern.

6. The optical encoder as claimed in claim 1, wherein
    the multiple photodiodes further comprise a third index photodiode,
    the index track further comprises a third index pattern, and
    when the first index pattern is aligned with the first index photodiode and the second index pattern is aligned with the second index photodiode according to the relative movement, the third index pattern is aligned with the third index photodiode.

7. The optical encoder as claimed in claim 6, wherein when the first index pattern is aligned with the first index photodiode and the second index pattern is aligned with the second index photodiode according to the relative movement, the reference index photodiode is not aligned with the first index pattern, the second index pattern or the third index pattern.

8. An optical encoder, comprising:
an encoding medium, comprising an index track, the index track comprising a first index pattern and a second index pattern;
multiple photodiodes, configured to detect a light variation generated by a relative movement with respect to the encoding medium, and the multiple photodiodes comprising a first index photodiode, a second index photodiode and a reference index photodiode configured to respectively generate a first photocurrent, a second photocurrent and a reference photocurrent according to the light variation; and
a signal processing circuit, configured to receive the first photocurrent, the second photocurrent and the reference photocurrent, and generate an index output indicating a predetermined position of the encoding medium when the first index pattern is aligned with the first index photodiode and the second index pattern is aligned with the second index photodiode according to the relative movement.

9. The optical encoder as claimed in claim 8, wherein the reference index photodiode is between the first index photodiode and the second index photodiode in the index track, and
when the first index pattern is aligned with the first index photodiode and the second index pattern is aligned with the second index photodiode according to the relative movement, the reference index photodiode is not aligned with the first index photodiode or the second index photodiode.

10. The optical encoder as claimed in claim 8, wherein when the first index pattern is aligned with the first index photodiode and the second index pattern is aligned with the second index photodiode according to the relative movement, the first photocurrent and the second photocurrent are larger than the reference photocurrent.

11. The optical encoder as claimed in claim 8, wherein the encoding medium further comprises a position track, and the index track and the position track are at different tracks on the encoding medium.

12. The optical encoder as claimed in claim 8, wherein the signal processing circuit comprises:
a trans-impedance amplifier (TIA), electrically coupled to the first index photodiode, the second index photodiode and the reference index photodiode, and configured to convert the first photocurrent, the second photocurrent and the reference photocurrent respectively to a first voltage, a second voltage and a reference voltage;
a first comparator, configured to compare the first voltage and the reference voltage to output a first comparison voltage;
a second comparator, configured to compare the second voltage and the reference voltage to output a second comparison voltage; and
an AND gate, configured to receive the first comparison voltage and the second comparison voltage to accordingly generate the index output.

13. The optical encoder as claimed in claim 12, wherein the TIA comprises:
a first TIA, comprising a first input end and a second input end, wherein the first input end is configured to receive the first photocurrent to generate the first voltage, and the second input end is configured to receive the reference photocurrent to generate the reference voltage; and
a second TIA, comprising a third input end and a fourth input end, wherein the third input end is configured to receive the second photocurrent to generate the second voltage, and the fourth input end is configured to receive the reference photocurrent to generate the reference voltage.

14. The optical encoder as claimed in claim 8, wherein the first index pattern and the second index pattern of the index track have different widths in a direction of the relative movement.

* * * * *